United States Patent
Habib et al.

(10) Patent No.: US 11,899,124 B2
(45) Date of Patent: Feb. 13, 2024

(54) INTERFACE FOR REALTIME, 3D RADAR ACTIVITY VISUALIZATION

(71) Applicant: Raytheon Company, Waltham, MA (US)

(72) Inventors: Wassim S. Habib, Dover, MA (US); Richard Fennelly, Sterling, MA (US); Mark G. Brodmerkle, Hudson, MA (US); Chukwuemeka Nolisa, Framingham, MA (US); Toni S. Habib, Marlborough, MA (US); James S. Connerney, Arlington, MA (US)

(73) Assignee: Raytheon Company, Tewksbury, MA (US)

( * ) Notice: Subject to any disclaimer, the term of this patent is extended or adjusted under 35 U.S.C. 154(b) by 721 days.

(21) Appl. No.: 16/851,381

(22) Filed: Apr. 17, 2020

(65) Prior Publication Data
US 2021/0325507 A1    Oct. 21, 2021

(51) Int. Cl.
  *G01S 7/20* (2006.01)
  *G01S 7/06* (2006.01)
  *G01S 7/22* (2006.01)

(52) U.S. Cl.
  CPC .............. *G01S 7/20* (2013.01); *G01S 7/066* (2013.01); *G01S 7/22* (2013.01)

(58) Field of Classification Search
  CPC .............. G01S 7/20; G01S 7/066; G01S 7/22
  See application file for complete search history.

(56) References Cited

U.S. PATENT DOCUMENTS

| | | | | |
|---|---|---|---|---|
| 4,005,415 A | * | 1/1977 | Kossiakoff | G01S 7/2921 |
| | | | | 342/182 |
| 10,830,890 B1 | * | 11/2020 | Keyser | G01S 17/10 |
| 2001/0009458 A1 | * | 7/2001 | Asaka | G01S 17/10 |
| | | | | 356/28.5 |
| 2008/0266169 A1 | * | 10/2008 | Akita | B60W 40/04 |
| | | | | 342/117 |
| 2018/0204329 A1 | * | 7/2018 | Cutu | G06T 5/001 |

(Continued)

FOREIGN PATENT DOCUMENTS

| | | | | |
|---|---|---|---|---|
| CN | 107247253 | | 10/2017 | |
| CN | 107247253 A | * | 10/2017 | ............... G01S 7/06 |

OTHER PUBLICATIONS

X. Tian and Y. Bar-Shalom, "Coordinate Conversion and Tracking for Very Long Range Radars," in IEEE Transactions on Aerospace and Electronic Systems, vol. 45, No. 3, pp. 1073-1088, Jul. 2009, doi: 10.1109/TAES.2009.5259184. (Year: 2009).*

(Continued)

*Primary Examiner* — Bernarr E Gregory
*Assistant Examiner* — Hailey R Le
(74) *Attorney, Agent, or Firm* — Daly, Crowley, Mofford & Durkee, LLP

(57) ABSTRACT

Methods and apparatus for providing realtime, 3D visualization of radar system functionality. A visualization system can receive information from a radar system, such as radar commands and radar parameters. After extracting data from the commands and/or parameters, the visualization system generates a three-dimensional (3D), realtime display showing a field of view (FOV) of radar operations including representations of beams generated by the radar system and targets tracked by the radar system.

17 Claims, 7 Drawing Sheets

(56) References Cited

U.S. PATENT DOCUMENTS

2019/0124260 A1* 4/2019 Lin .................... H04N 5/23238
2019/0173196 A1* 6/2019 Achour ............. H01Q 15/0086

OTHER PUBLICATIONS

International Search Report and Written Opinion dated Jun. 24, 2021 for International Application No. PCT/US2021/020798; 15 Pages.

Stamatovic et al., "Design and Implementation of a Modern Radar Display for Air Surveillance Applications"; IEEE, 2012 20$^{th}$ Telecommunications Forum (TELFOR), https://www.ieeexplore.ieee.org/document/6419509, Nov. 2012; 4 Pages.

Wang et al. "A Visual System for Radar Scheduling Process in Three-Dimensional Virtual Environment", IEEE, 2016 CIE International Conference on Radar (RADAR), https://www.ieeexplore.ieee.org/document/8059410, Oct. 2016; 4 Pages.

Response (with English Translation) to Israeli Office Action dated Dec. 15, 2022 for Israeli Application No. 296639; Response filed Jan. 5, 2023; 5 Pages.

Israeli Office Action (with English Translation) dated Dec. 15, 2022 for Israeli Application No. 296639; 7 Pages.

PCT International Preliminary Report on Patentability dated Oct. 27, 2022 for International Application No. PCT/US2021/020798; 9 Pages.

Israeli Notice of Allowance (with Allowed Claims) dated Apr. 23, 2023 for Israeli Application No. 296639; 6 Pages.

\* cited by examiner

INTERFACE FOR REALTIME, 3D RADAR ACTIVITY VISUALIZATION

BACKGROUND

Operation of modern radar is highly complex and encompasses multi-mission execution, which may include predefined raster searches, dedicated tracking events, electronic protection tasks, complex discrimination waveforms, and the like. These activities may be interleaved with other low-level events, such as clutter surveys, waste pulses, etc. Scheduling of these actions is gated by limited radar resources, tight timelines, and strict performance requirements, such as revisit rates and detection probability. During live operation, conventional radar systems do not enable a user to visualize and comprehend radar performance in realtime, especially with respect to dynamic targets, stressing environmental effects, or threatening electronic attack situations.

SUMMARY

Embodiments of the invention provide methods and apparatus for realtime, 3D (three dimensional) visualization of operations of a radar system. The visualization can determine, in realtime, performance of the radar with respect to coverage areas, waveform placement, pointing accuracy, tracking accuracy, scheduling performance and efficiency, for example.

In embodiments, a visualization system provides the capability to overlay a radar display with a realtime 3D representation of scheduled radar events to accurately visualize and determine, in realtime, the performance of the radar for various parameters. In embodiments, visualization of the scheduled radar events is provided in the context of high fidelity representation of topology with respect to actual radar placement. The ability to provide realtime insight into radar operation is desirable during radar integration, testing or live tactical operation, as well as flight test events, for example. Embodiments of the invention provide 3D visual display and insight without impact on the radar operation or performance. In embodiments, a visualization system can be added to an existing radar system without modification to the radar system other than extracting data. The visualization system can receive radar signal processor and system commands along with track and detection data for processing by a module for formatting and display.

In one aspect, a method comprises: receiving by a visualization system from a radar system: radar commands; and radar parameters; extracting information from fields of the received radar commands and fields of the received radar parameters; and generating a three-dimensional (3D), realtime display showing a field of view (FOV) of radar operations including representations of beams generated by the radar system and targets tracked by the radar system.

A method can further include one or more of the following features: the display further includes track history of the targets tracked by the radar system, the display further includes a location of the radar system, the beams generated by the radar system include search beams and short beams, the display further includes beam history of the beams generated by the radar system, an intensity of beams in the beam history corresponds to an amount of time elapsed since the respective beams were generated, the FOV includes topographical information, the radar commands are generated by a control module, a signal processing module, beamforming module and/or an antenna module, the fields of the radar commands and/or the fields of the radar parameters include minimum and maximum range extent, the fields of the radar commands and/or the fields of the radar parameters include RAE, beamwidth, command type, and range min and range max, the visualization system converts coordinate data from the radar system to a different coordinate system for the display, the visualization system converts RUV (range, u, v, coordinates) data from the radar system to relative range, azimuth, elevation (RRAE) data for the display, the display includes a first one of the beams having a first color extending from the radar location to a minimum range value and a second color after the minimum range value, different types of the beams have different colors, the display includes for the representations of the tracked targets a minimum range extent and a maximum range extent corresponding to a minimum and maximum detecting range for a tracking beam used for tracking the tracked targets, and/or the FOV is generated from a virtual point in relation to the location of the radar.

In another aspect, a virtualization system is configured to be coupled to a radar system and comprises: a processor and memory configured to: receive from the radar system: radar commands; and radar parameters; extract information from fields of the received radar commands and fields of the received radar parameters; and generate a three-dimensional (3D), realtime display showing a field of view (FOV) of radar operations including representations of beams generated by the radar system and targets tracked by the radar system.

A system can further include one or more of the following features: the display further includes track history of the targets tracked by the radar system, the display further includes a location of the radar system, the beams generated by the radar system include search beams and short beams, the display further includes beam history of the beams generated by the radar system, an intensity of beams in the beam history corresponds to an amount of time elapsed since the respective beams were generated, the FOV includes topographical information, the radar commands are generated by a control module, a signal processing module, beamforming module and/or an antenna module, the fields of the radar commands and/or the fields of the radar parameters include minimum and maximum range extent, the fields of the radar commands and/or the fields of the radar parameters include RAE, beamwidth, command type, and range min and range max, the visualization system converts coordinate data from the radar system to a different coordinate system for the display, the visualization system converts RUV (range, u, v, coordinates) data from the radar system to relative range, azimuth, elevation (RRAE) data for the display, the display includes a first one of the beams having a first color extending from the radar location to a minimum range value and a second color after the minimum range value, different types of the beams have different colors, the display includes for the representations of the tracked targets a minimum range extent and a maximum range extent corresponding to a minimum and maximum detecting range for a tracking beam used for tracking the tracked targets, and/or the FOV is generated from a virtual point in relation to the location of the radar.

BRIEF DESCRIPTION OF THE DRAWINGS

The foregoing features of this invention, as well as the invention itself, may be more fully understood from the following description of the drawings in which.

DETAILED DESCRIPTION

Figure 1:
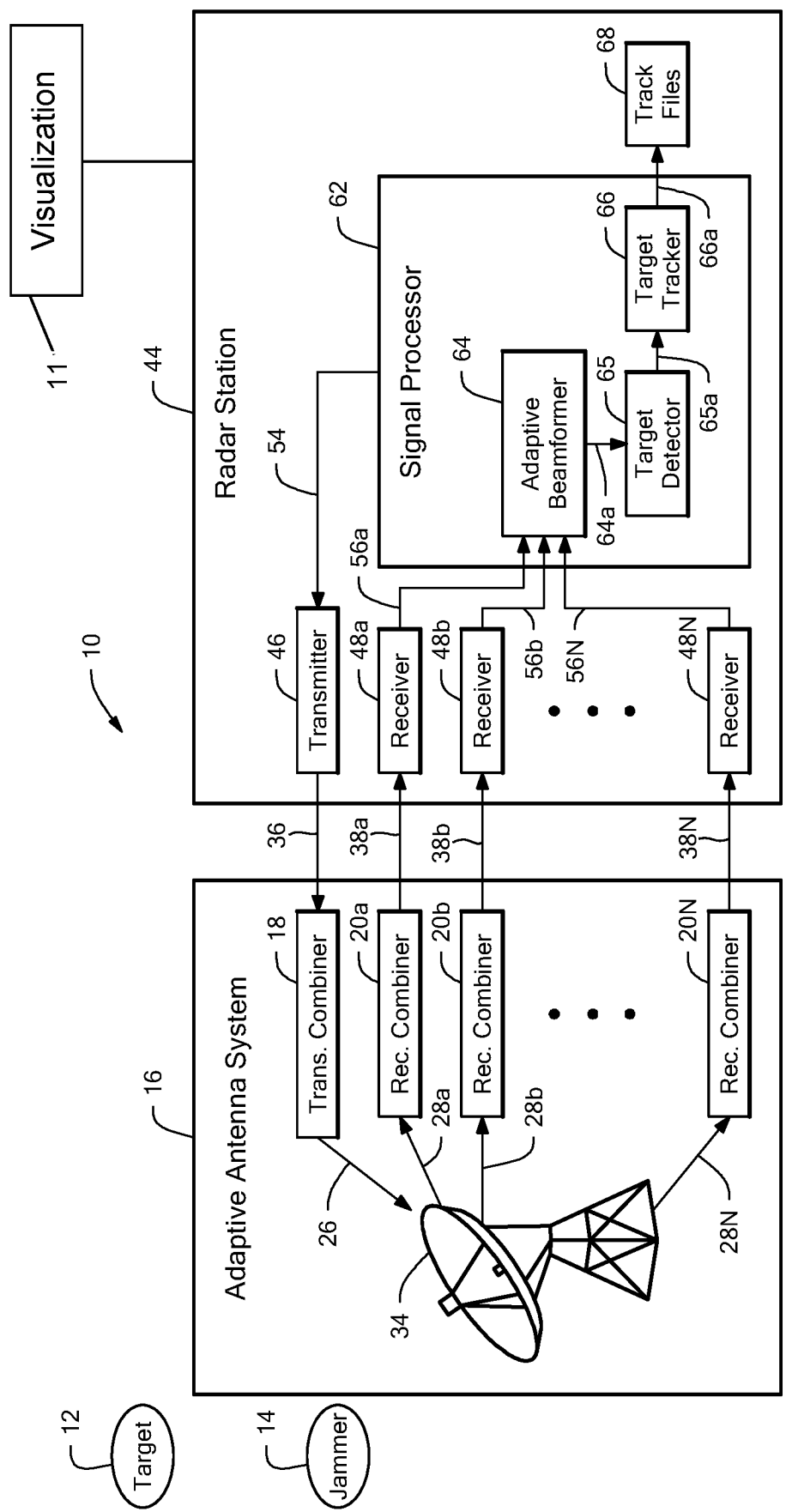
FIG. 1 shows an example radar system coupled to a visualization system.

FIG. 1 shows an example radar system 10 having an illustrative realtime 3D radar visualization system 11 in accordance with example embodiments of the invention. The radar system 10 can detect and/or track any practical number of targets, e.g., target 12. In embodiments, the radar system may also detect more jammers, e.g., jammer 14. The radar system 10 includes an antenna system 16 coupled to a radar station 44. The antenna system 16 includes an antenna array 34 having subarrays (not shown). Each of the subarrays has elements (not shown) providing element outputs, for example, element outputs 28a-28N, each having a respective plurality of element outputs, that are statically combined by a receive combiner circuit, for example receive combiner circuits 20a-20N, respectively, to provide respective beamformed subarray output signals, for example, beamformed subarray output signals 38a-38N, having statically beamformed characteristics.

In one particular embodiment, each of the receive combiner circuits 20a-20N is a separate circuit board. While three receiver combiner circuits 20a-20N are shown, associated with three subarrays (not shown), it should be understood that more than three subarrays and more than three associated receive combiner circuits can be provided. Each of the receive combiner circuits 20a-20N can be the same or they can be different, depending upon the form of the subarray to which they are coupled.

The antenna array 34 also transmits signals 26 provided to selected ones of the array elements via a transmit combiner circuit 18. In general, the transmit combiner circuit 18 is different from the receive combiner circuits 20a-20N in that the transmit combiner circuit 18 operates in conjunction with one selected set of array elements symmetrically disposed about the antenna array 34, for example, all of the array elements, while each of the receive combiner circuits 20a-20N operates in conjunction with a different subarray having array elements. Each subarray has a different phase center at a different position.

The beamformed subarray output signals 38a-38N are coupled to receivers to amplify and downconvert the beamformed subarray output signals 38a-38N to lower frequency received signals 56a-56N. A signal processor 62 includes a beamformer circuit 64 that digitizes the lower frequency received signals 56a-56N and performs adaptive beamforming. The adaptive beamforming applies complex adaptive weighting factors to the lower frequency received signals 56a-56N and combines them to generate adaptive receive beam signals 64a having receive beam adaptive characteristics.

The signal processor 62 also includes a target detector 65 to detect targets and to compute target locations using the adaptive receive beam signals 64a and provides target detection data 65a to a target tracker 66, which provides track update information 66a to track files 68. The track files 68 are provided to a radar system operator. The target tracker 65 can also provide a transmit signal direction 54 to a transmitter 46. An amplified signal 36 is provided to the transmit combiner circuit 18.

It is understood that a visualization system can be coupled to, or form part of, a wide range of radar systems, such as active electronically scanned radars, air and missile defense radars, mobile surface-to-air missile/anti-ballistic missile systems, lower tier air and missile defense sensor systems, and the like.

Figure 2:
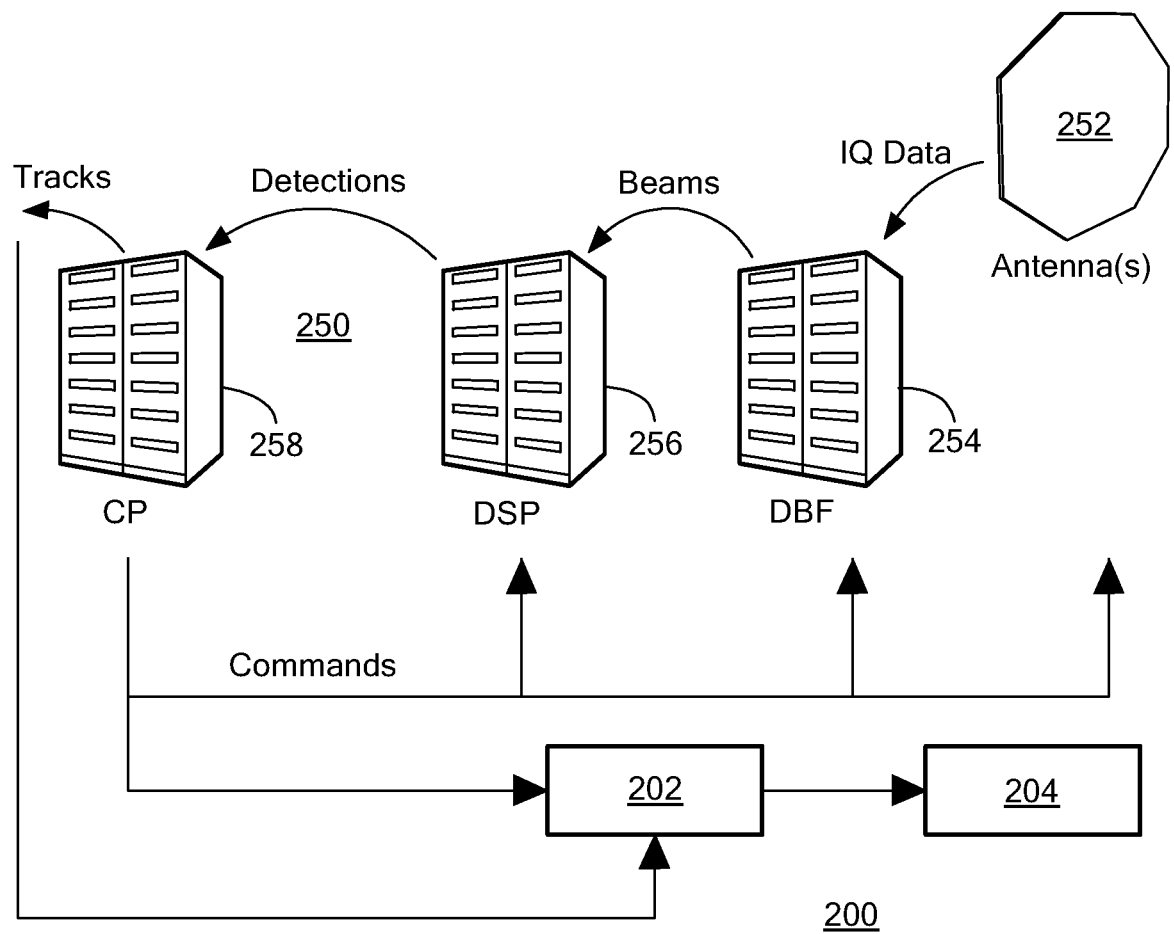
FIG. 2 is a functional block diagram of a radar system and a visualization system.
Figure 2A:
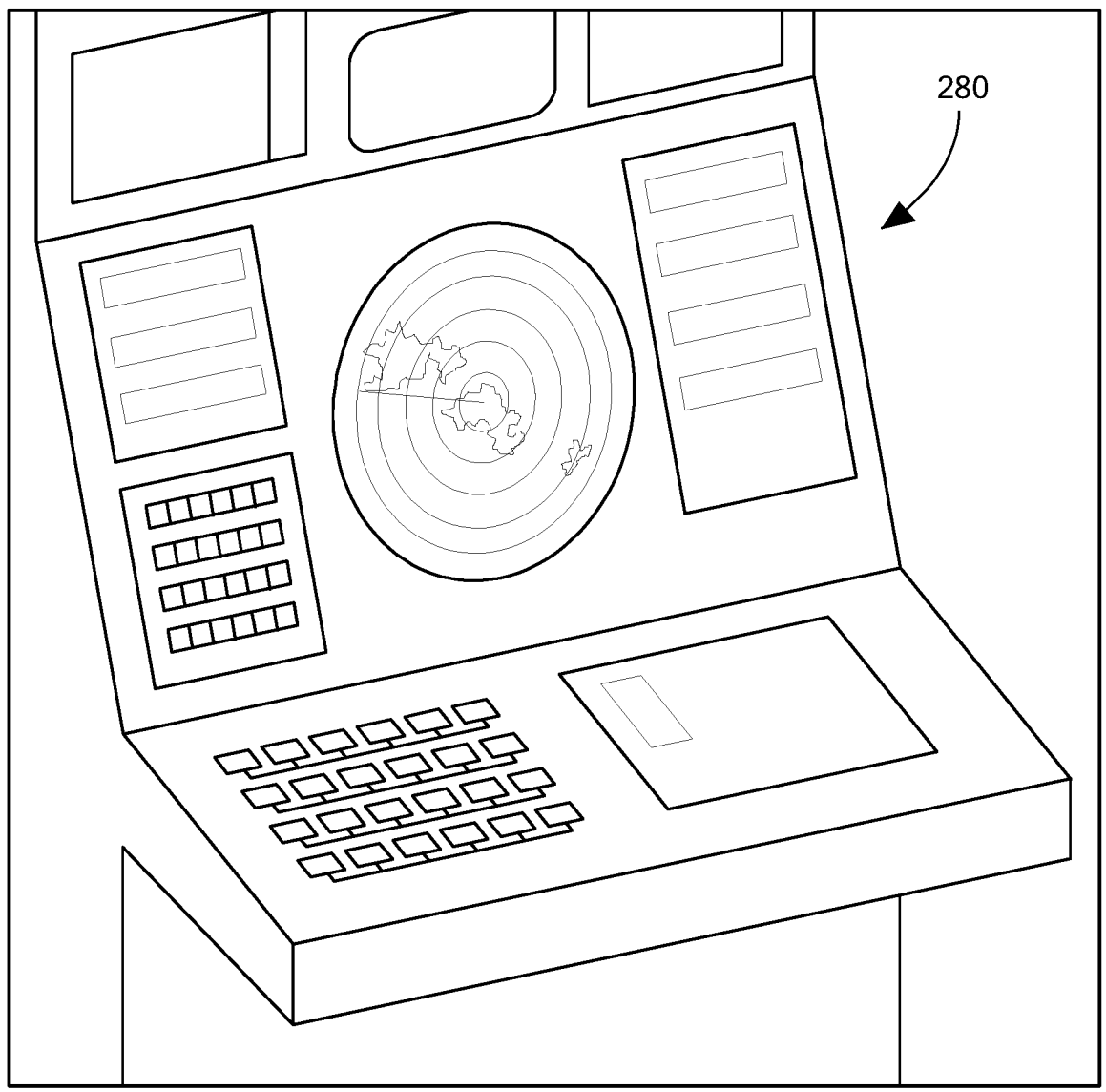
FIG. 2A is a pictorial representation of a prior art display for a radar system.

FIG. 2 shows an example of an example visualization system 200 coupled to a simplified radar system 250. The radar system 250 includes an antenna system 252 that provides inphase and quadrature data to a digital beamformer module 254, which provides beam data to a signal processing module 256. In embodiments, the signal processing module 256 comprises a digital signal processing module having any practical number of processors, memory, and components. The signal processing module 256 processes the beam data to detect targets, track targets, and the like. A control processor module 258 generates commands 260 to components of the radar system including the signal processor 256, the beamformer 254, and antenna system 252. The control processor module 258 receives the target and track data from the signal processing module 256 for further processing and displaying the targets and tracks on a conventional display, such as the prior art 2D display 280 shown in FIG. 2A showing a conventional circular screen with targets shown while the display is swept as a given interval.

Referring again to FIG. 2, the visualization system 200 includes a data processing module 202 and a display module 204 for providing a 3D display for visualizing radar events and the like. For example, the data processing module 202 listens for radar command messages 260 from the radar control processor 258 to the hardware including the signal processor 256, the beamformer 254, and the antenna system 252. When a command is received, the data processor 202 translates the command into an internal command format. The data processing module 202 obtains additional parameters from fields in the received command 260, such as Rmin (Minimum Range Extent) Rmax (Maximum Range Extent). The data processing module 202 can convert RUV (Range, U, V Coordinates), which may be used by the radar system, to RRAE (Relative Range, Azimuth, Elevation), for example, to facilitate displaying the radar functionality. It is understood that conversion to and from any suitable coordinate systems in the radar and visualization systems can be performed. The data processing module 202 can also extract relevant fields and insert the extracted information into message for the display module 204. Example fields include:

RAE (Range, Azimuth, Elevation)
Beamwidth
Command type (Air Mission, Ballistic Mission, Search, Track . . . )
Rmin/Rmax (Minimum Range Extent, Maximum Range Extent)

The extracted fields are sent by the data processing module 202 to the display module 204, using UDP (User Datagram Protocol) or other suitable protocol. In embodiments, to reduce the number of individually transmitted messages, at least some of the messages to the display module are bundled together.

The data processing module 202 can also obtain tactical messages, such as track updates, discrimination results and forward relevant fields to the display module, for example to update status, track data, discrimination data, etc.

The display module 204 utilizes the various received messages and extracted fields to provide a realtime 3D representation of the scheduled radar events to accurately visualize and determine, in realtime, the performance of the radar for various parameters. For example, beam data and beams are displayed at the location described in the message, e.g., Az/El/Rmin/Rmax. For each beam, a cone shape of the beam is displayed based upon the commanded beamwidth. The beam can be displayed from the radar position up to the calculated Rmin value. From the Rmin value, the beam volume can be displayed in a different color, for example, up to the calculated Rmax in order to depict the commanded receive window.

Since the rate of beam commands may be high, in example embodiments, up to N beams are allowed to be displayed concurrently and this control is given for each 'beam type,' e.g., each type of search can display N beams concurrently, and track updates can display M beams concurrently. In addition, the displayed circular portion of a beam at the Rmax location is allowed to 'linger' for some amount of time in order to help visualize search volumes and show beam history. Over time, these shapes will decay and will be redrawn once commanded again.

In embodiments, each beam may be color coded based upon beam type. For example, different colors are displayed for track updates based upon the waveform type, e.g., NB/WB (Narrow Band, Wide Band). Additional color coding is supported for search beams (lower Air Mission, Upper Air Mission . . . ), e.g., different search volumes will appear as different color beams.

For status type data, such as combat system connectivity, associated entries in a status table can be updated. For track data, existing track locations can be updated or new tracks can be created if they do not exist. For discrimination data, such as ballistic reentry vehicle, ballistic debris, rocket fuel tank, booster stage, and the like, the color of the associated track can be updated based on the discrimination result.

Figure 3:
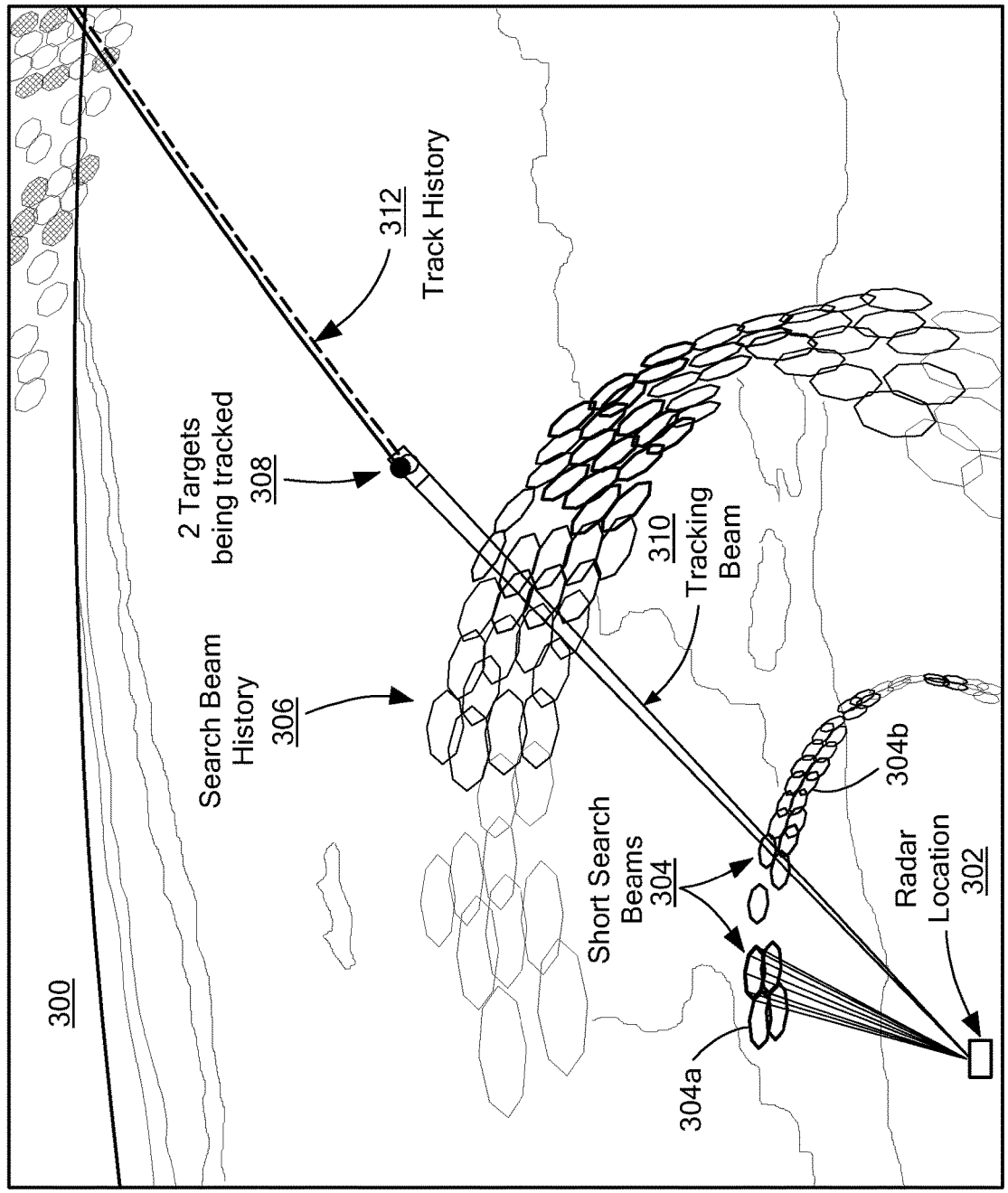
FIG. 3 is a graphical under interface in the form of a display of 3D, realtime radar system functionality.

FIG. 3 shows an illustrative display 300 generated by an example visualization system for a given radar system that can perform target identification and tracking. A radar system has a location 302 shown in the display. In embodiments, the display 300 represents a field of view (FOV) from a virtual location at a selected azimuth and elevation so that the display 'looks down' on the radar and the beams generated by the radar system. Topographical details, such as elevational information, rivers, canyons, and the like can be shown for the given field of view. In some embodiments, meteorological information, such as clouds, precipitation, temperature and the like can be indicated on the display 300.

In the illustrated embodiment, the display 300 includes a series of 'short' search beams 304 generated by the radar where the beams 304 have a range that is relatively short. A first portion 304a of the short beams are currently being generated and a second portion of the beams 304b were generated within some previous amount of time. The first portion 304a of short beams are indicated to be currently generated by the lines extending from the radar location 302 to the range for the beams 304a. In embodiments, the intensity of the short beams 304 shown in the display 300 correspond to the amount of time since the beams were generated. For example, the most recent beams 304 are shown with more intensity that older beams.

The example display 300 also includes a search beam 306 history. It is understood that search beams may be pencil type beams having characteristics tailored to find a new target. In embodiments, the intensity of the displayed search beams 306 shown in the display 300 correspond to the amount of time since the beams were generated. For example, the most recent beams 306 are shown with more intensity that older beams. It is understood that the beams are shown at a given range for ease of explanation as beams extend from the radar at the radar location 302 until the beams dissipate. The radar can detect signal return from a target above some threshold signal to noise ratio (SNR).

The example display 300 can show tracked targets 308 along with a tracking beam 310 and track history 312. In the illustrated embodiment, two targets are being tracked.

Figure 4:
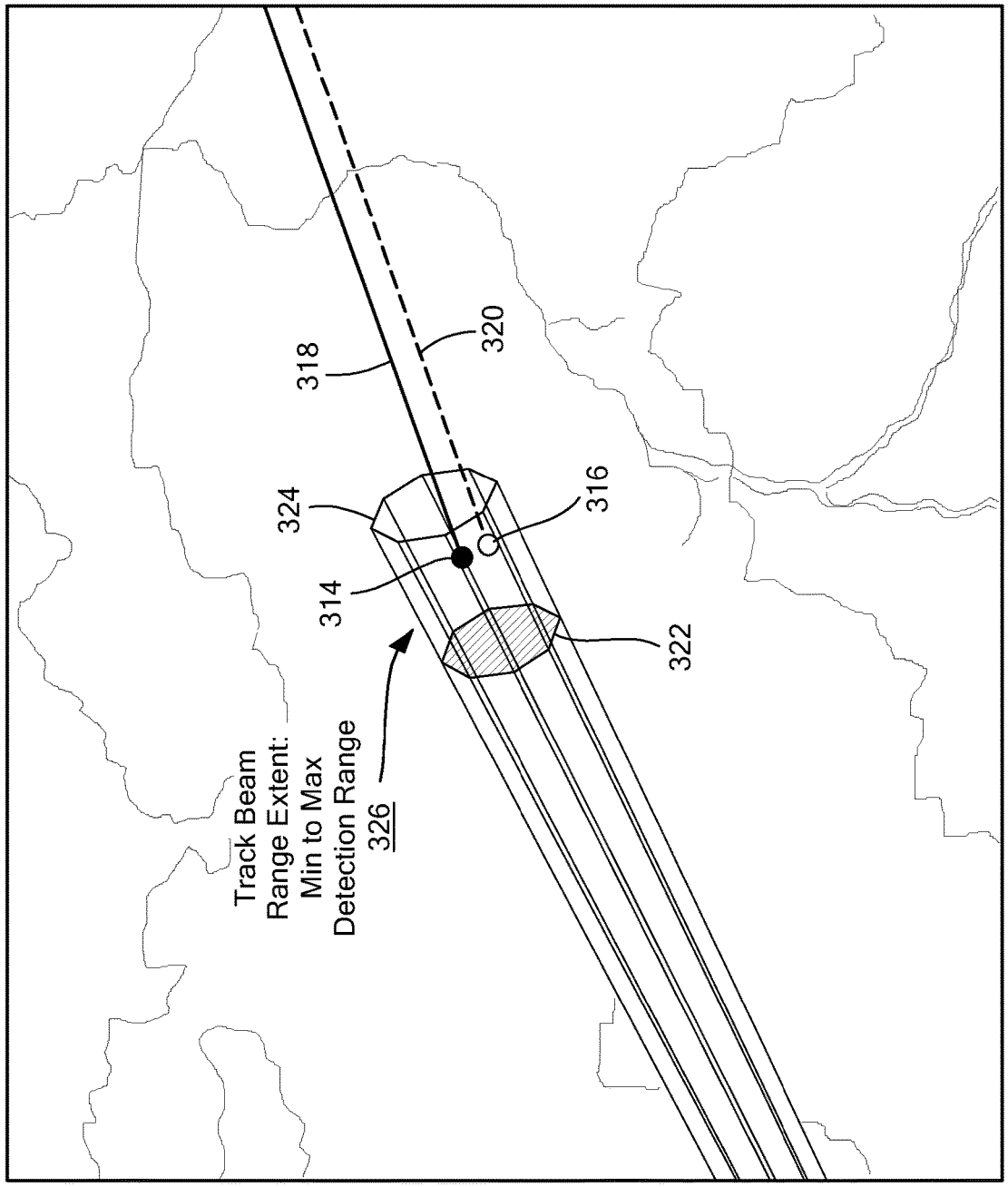
FIG. 4 is a further graphical under interface in the form of a display of 3D, realtime radar system functionality.

FIG. 4 shows a display 400 of the tracked targets 308 of FIG. 3 in more detail. The tracked targets 308 include first and second targets 314, 316. In the illustrated embodiment, the first and second targets 314, 316 are similar in range, are closely spaced, and have similar tracks, which may indicate that the targets are likely aircraft, for example. The first target 314 has a first track history 318 and the second target 316 has a second track history 320. The first and second targets 314, 316 are illuminated by the same tracking beam 310. In the illustrated embodiment, the tracking beam 310 has a minimum range extent 322 and a maximum range extent 324, which form a minimum to maximum detection range for the tracking beam.

As described above, the visualization system extracts information from the radar system to generate a display of radar functionality. For example, to generate the displays shown in FIGS. 3 and 4, the visualization system obtains command information, such as search and track, target information, such as identified targets and tracked targets, beamforming information, such as beam characteristics and beam history, and topographical information, to generate 3D realtime displays that show radar functionality.

In example embodiments, the visualization system generates a frame of reference based on the location 302 of the radar system. Based on the radar location 302, beams, tracks, history, targets, and the like, are displayed in relation to the radar location. In embodiments, the visualization system converts RUV (range, u, v, coordinates) data from the radar system to relative range, azimuth, elevation (RRAE) data for the display.

In embodiments, for the beam display (and only for the beam display), a reference frame origin (RFO) is used to define the radar origin in a 3D coordinate system, as well as the radar face orientation. Depending on the radar system, the RFO could be static (for nonmoving radars) or dynamic (for moving radars). The beam origin (starting point) defines the radar location. The size, orientation and range are calculated from the commanded RUV parameters, along with the RFO, which are converted to RRAE relative to the radar location. For radars with multiple faces, an RFO per face will be used. In these situations, the commanded events will contain a "face" parameter to indicate the relevant face. In embodiments, dynamic RFOs are received dynamically from the radar system RFO publication/transmission. Static RFOs can be either adapted at startup or received dynamically. For tracks, history and targets, the RFO may not be used since these are generated by the radar system in 3D coordinate systems.

In example embodiments, the display/display field of view (FOV) is defined by the visualization system end-user who can dynamically change the FOV. The FOV may be taken from a virtual point somewhere in space so that the radar location, BEAMS, tracks, targets, are shown in the display.

Figure 5:
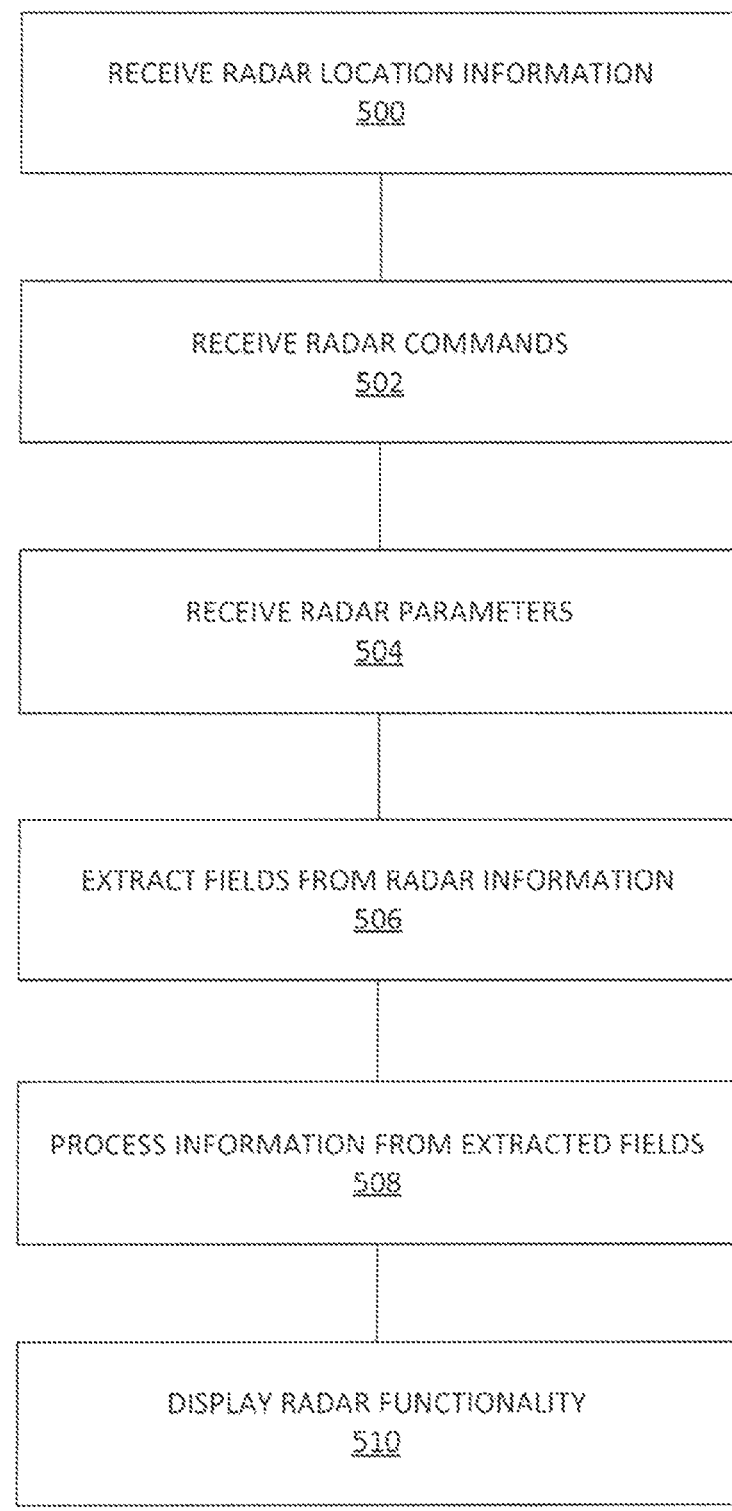
FIG. 5 is a flow diagram of an example sequence of steps for providing a 3D, realtime display of radar system functionality.

FIG. 5 shows an example sequence of steps for generating realtime 3D displays showing radar functionality. In step 500, visualization system received a location of a radar system. The visualization system can convert RUV (Range, U, V Coordinates), for example, used by the radar system to RRAE (Relative Range, Azimuth, Elevation), for example. In step 502, the visualization system receives radar commands for various components of the radar system, such as control module, signal processing module, beamforming module, antenna module, for example. In step 504, the visualization system receives operating parameters from the radar system. In embodiments, the visualization system does not interfere in operation of the radar, but rather, processes information in realtime for generating displays of radar functionality including beam generation, target tracking, etc.

In step 506, the visualization system extracts information from the radar commands and radar parameters. For example, information contained in fields of radar messages can be extracted. In step 508, the extracted information is processed by the visualization system. In step 510, the processed information is used to generate a display of radar functionality, such as the displays of FIGS. 3 and 4. It is understood that the visualization system extracts radar information on an ongoing basis to update the display over time as different beams are generated and tracked targets change heading.

Figure 6:
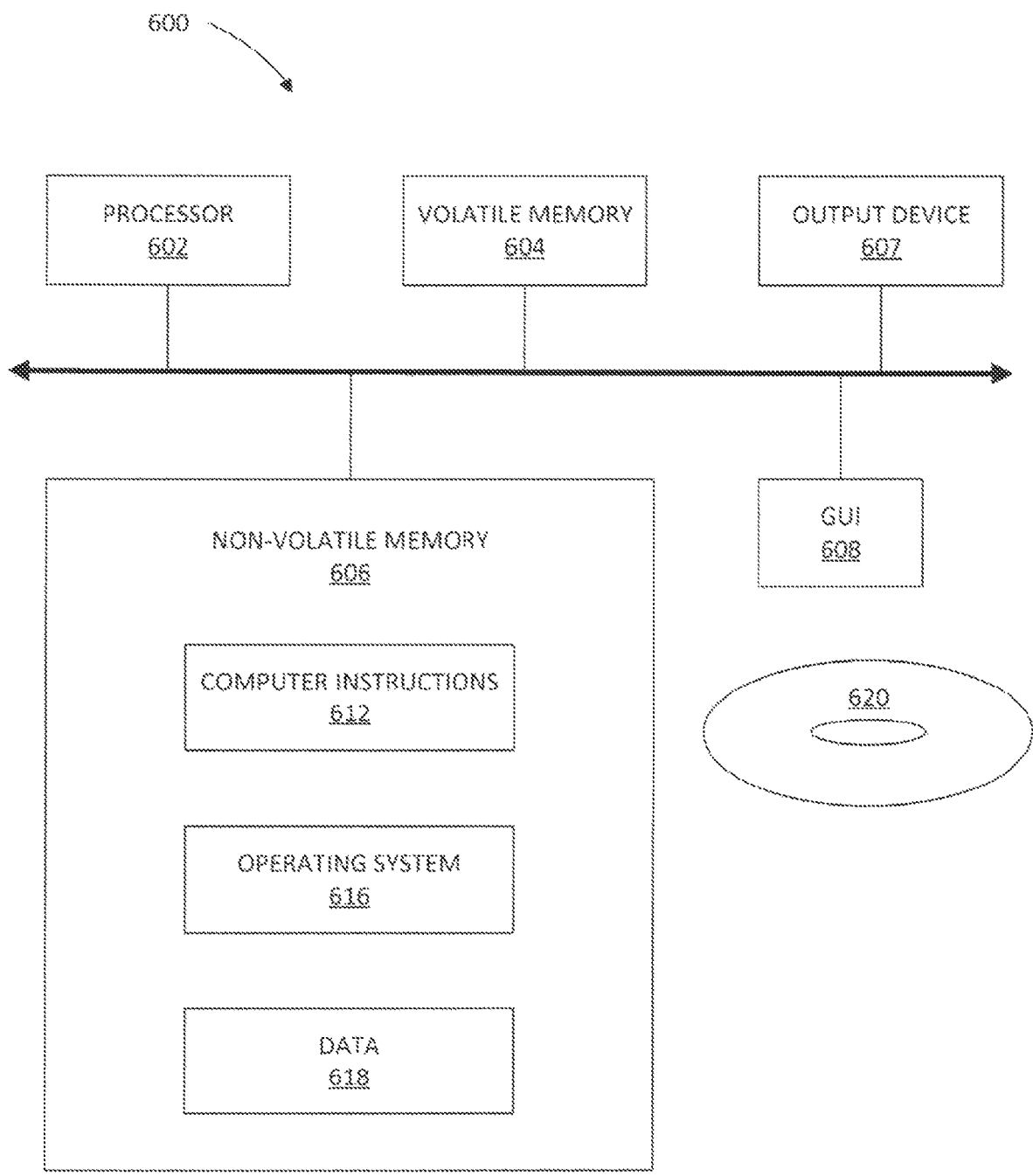
FIG. 6 is a schematic representation of an example computer that can perform at least a portion of the processing described herein.

FIG. 6 shows an exemplary computer 600 that can perform at least part of the processing described herein. The computer 600 includes a processor 602, a volatile memory 604, a non-volatile memory 606 (e.g., hard disk), an output device 607 and a graphical user interface (GUI) 608 (e.g., a mouse, a keyboard, a display, for example). The non-volatile memory 606 stores computer instructions 612, an operating system 616 and data 618. In one example, the computer instructions 612 are executed by the processor 602 out of volatile memory 604. In one embodiment, an article 620 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer.

Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method, comprising:
receiving by a visualization system from a radar system:
    radar commands; and
    radar parameters;
extracting information from fields of the received radar commands and fields of the received radar parameters; and
generating a three-dimensional (3D), realtime display showing a field of view (FOV) of radar operations including representations of beams generated by the radar system and targets tracked by the radar system,
wherein the display further includes beam history of the beams generated by the radar system and an intensity of beams in the beam history corresponds to an amount of time elapsed since the respective beams were generated.

2. The method according to claim 1, wherein the display further includes track history of the targets tracked by the radar system.

3. The method according to claim 1, wherein the display further includes a location of the radar system.

4. The method according to claim 1, wherein the beams generated by the radar system include search beams and short beams.

5. The method according to claim 1, wherein the FOV includes topographical information.

6. The method according to claim 1, wherein at least one of the radar commands are generated by a control module, a signal processing module, beamforming module, and an antenna module.

7. The method according to claim 1, wherein at least one of the fields of the radar commands and the fields of the radar parameters include minimum and maximum range extent.

8. The method according to claim 1, wherein at least one of the fields of the radar commands and the fields of the radar parameters include Range, Azimuth, Elevation (RAE), beamwidth, command type, and range min and range max.

9. The method according to claim 1, wherein the visualization system converts coordinate data from the radar system to a different coordinate system for the display.

10. The method according to claim 1, wherein the visualization system converts RUV (range, u, v, coordinates) data from the radar system to relative range, azimuth, elevation (RRAE) data for the display.

11. The method according to claim 1, wherein the display includes a first one of the beams having a first color extending from the radar location to a minimum range value and a second color after the minimum range value.

12. The method according to claim 1, wherein different types of the beams have different colors.

13. The method according claim 1, wherein the display includes for the representations of the tracked targets a minimum range extent and a maximum range extent corresponding to a minimum and maximum detecting range for a tracking beam used for tracking the tracked targets.

14. The method according to claim 1, wherein the FOV is generated from a virtual point in relation to the location of the radar.

15. A virtualization system configured to be coupled to a radar system, comprising:
   a processor and memory configured to:
      receive from the radar system:
         radar commands; and
         radar parameters;
      extract information from fields of the received radar commands and fields of the received radar parameters; and
      generate a three-dimensional (3D), realtime display showing a field of view (FOV) of radar operations including representations of beams generated by the radar system and targets tracked by the radar system, wherein the display further includes beam history of the beams generated by the radar system and an intensity of beams in a beam history corresponds to an amount of time elapsed since the respective beams were generated.

16. The system according to claim 15, wherein the display further includes track history of the targets tracked by the radar system.

17. The system according to claim 15, wherein the display includes a first one of the beams having a first color extending from the radar location to a minimum range value and a second color after the minimum range value.

* * * * *